United States Patent Office 3,549,987
Patented Dec. 22, 1970

3,549,987
LASER EPR SYSTEM
Jay S. Hall and John F. Scarzello, Annapolis, Md., assignors to the United States of America as represented by the Secretary of the Navy
Filed Oct. 31, 1967, Ser. No. 679,402
Int. Cl. G01r 33/08
U.S. Cl. 324—.5       8 Claims

ABSTRACT OF THE DISCLOSURE

An electron paramagnetic resonance (EPR) spectrometer for measuring the earth's magnetic field. The coherent light of a laser beam is amplitude modulated, radiated towards the earth, and the back scattered wave is detected and observed.

The invention described herein may be manufactured and used by or for the Government of the United States of America for governmental purposes without the payment of any royalties thereon or therefor.

BACKGROUND OF THE INVENTION

The present invention relates generally to electron paramagnetic resonance (EPR) spectrometers and more particularly to a radio frequency (RF) modulated laser light beam for measuring the earth's magnetic field.

In the past (EPR) studies have generally been conducted by either directly detecting the microwave energy reflected from a sample being tested or heterodyning the reflected energy to derive a difference frequency that is amplified and then detected. For samples having large electron spin populations, for example $10^{12}$, this approach is quite satisfactory. Tests on materials exhibiting lower electron spin populations, on the order of $10^9$, however, yield inaccurate data because the signal to noise ratio is too small to distinguish the reflected energy from the system quiescent noise level. Prior art devices have attempted to reduce system noise by coupling the microwave signal reflected from the sample to a maser amplifier.

Other prior art devices operate by superimposing on the field to be measured, a cyclically varying magnetic field. A probe, containing a sample of some material whereof the proton-resonance characteristic is known, is subjected to the joint effects of the field to be measured and the cyclically varying field added thereto. The instrument gives an indication when the cyclically varying field sweeps through a point of nuclear resonance to a known frequency. Although instruments of this character are of extreme delicacy and accuracy, measurements of the type which it is desired to make with them become extremely laborious, since the properties to be investigated must be plotted out by the point-by-point method. So many parameters must be observed at the same time that the observations become extremely difficult if not actually impossible.

Optical pumping of gas cells has been used to increase the sensitivity of the detection of molecular resonance of the gas by increasing the population differences between energy transition levels. As is well known, optical transmission of a gas cell changes with application of a resonance radio frequency field. Since the resonant frequency varies with the strength of the magnetic field, the quantity of light transmitted through the cell, as detected by a photocell, represents an average of the magnetic field strength.

Commercial units available use low frequency Zeeman transitions either in self-oscillating magnetometers or in direct current devices with a feedback control system. The sensitivity of these devices is good but variations in absolute values of more than two orders of magnitude larger than the minimum detectable signal have been observed. This limit to absolute precision is due mainly to two effects: one being the shift in frequency caused by variation in the intensity of the light used for optical pumping; the second, and more serious effect is a variation with orientation due to the structure of the Zeeman transition in the earth's field and strong relaxation produced by the pumping light. As the relative intensities of the components change with the orientation in a magnetic field, a shift in the output frequency will occur.

Other prior art instruments used to measure the earth's magnetic field as antisubmarine warfare (ASW) gear are principally the optically pumped rubidium-vapor and meta-stable helium resonance magnetometers and the fluxgate magnetometers. Survey magnetometers must make several passes over an area to obtain the earth's field contours or to detect a dipole. The range and therefore its usefulness is limited by the sensitivity, geomagnetic disturbances, distance from the suspected dipole and geologic anomalies which occur in the survey path.

SUMMARY

The present invention eliminates or greatly reduces such limitations in devices for detecting and measuring a magnetic field by utilizing an (EPR) frequency modulated laser or maser beam of predetermined frequency which is radiated to impinge on the surface to be measured. The (EPR) frequency modulated laser beam is absorbed by water and its dissolved salts. Greatest absorption from the (RF) field will occur at the precessional frequency of the surface to be tested. The back scattered (RF) wave is then detected and presented on an oscilloscope. The information contained in the reflected signal is related to the magnetic field intensity at the surface of the ocean. Submerged objects which produce magnetic anomalies at the surface or irregularities in the surface to be tested, when viewed on a television screen or a scanning device, present irregular contours, and thus are readily detected. Operation in earth satellites for geomagnetic surveys and monitoring nuclear explosions is also possible.

It is accordingly an object of the present invention to provide a new and improved magnetic field sensing device of simple and inexpensive construction and operation.

Another object is to provide a novel magnetic field sensing device constructed in such a manner as to make the maximum utilization of the magnetic flux presented, and thereby permitting the sensing device to be widely spaced from the source of the magnetic field being sensed.

A further object is to provide a new and improved system for conducting (EPR) measurements.

A still further object is to provide a system for the measurement of the earth's magnetic field using an (EPR) frequency modulated laser.

With these and other objects in view, as will hereinafter more fully appear, and which will be more particularly pointed out in the appended claims, reference is now made to the following description taken in connection with the accompanying drawings in which:

FIG. 3 shows a block diagram of a scanner used for contour presentation; and

THEORETICAL CONSIDERATIONS

Figure 1:
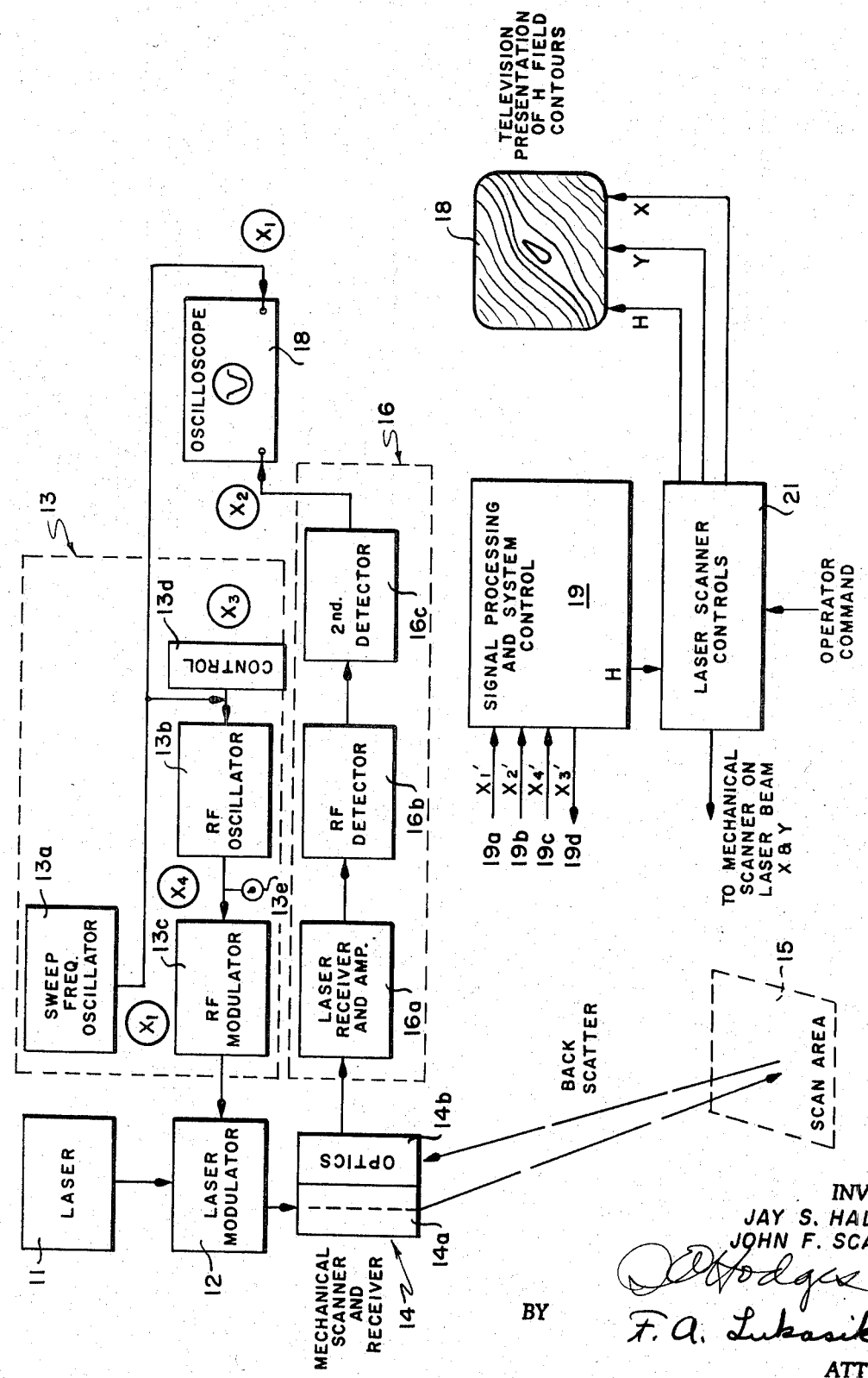
FIG. 1 shows a block diagram of a preferred embodiment of the invention.

The principles of paramagnetic resonance, and the information obtained by this technique, has been presented, for example, in the article by R. G. Marcley in the American Journal of Physics, vol. 29, 1961, page 492. Paramagnetic substances are those whose atoms or molecules possess permanent magnetic dipole moments. When a magnetic field is applied, these permanent magnetic dipoles tend to line up in the direction of the field and so the substance becomes magnetized. This process is opposed by the action of random thermal motions which try to make the dipoles point in random directions. The two effects balance, resulting in a magnetization which is proportional to the field strength and inversely proportional to the temperature. The source of these permanent magnetic dipole moments is the motion of the electrons.

When a magnetic field is applied to an atom with a magnetic moment, it exerts a torque which tries to line up the magnetic moment parallel to the direction of the applied field. The resulting motion is complicated by the presence of the angular momentum which can be conveniently demonstrated by analogy with a gyroscope. The gyroscope consists of a heavy flywheel, which is set into rapid rotation, mounted on gimbals which support the flywheel while allowing the axis of rotation complete freedom to point in any direction. If the mounting is well balanced, there are no torques acting on the flywheel and the axis of rotation continues to point in any direction in which it is set. Assume that it has been set in a horizontal direction. If it is assumed that the angular momentum of the flywheel represents the angular momentum of the electrons in a paramagnetic atom, then the effect of applying a magnetic field can be simulated by hanging a weight on one end of the shaft about which the flywheel spins. This exerts a torque on the flywheel about a horizontal axis at right angles to the axis of rotation. Instead of tipping over, the axis of rotation of the flywheel begins to rotate uniformly about a vertical axis. This motion is called precession. The angular velocity of precession may be increased either by increasing the weight which is causing it or by slowing down the rotation of the flywheel.

If a sample of a paramagnetic material is immersed in a uniform magnetic field $H_0$, the electrons are caused to precess at a rate proportional to $H_0$. If the precessing electrons are now subjected to an (RF) magnetic field $H_1$ normal to $H_0$, and the (RF) field frequency is adjusted to be equal to the rate of precession, a resonance will be observed with the sample absorbing a measurable amount of energy from the (RF) field. This phenomenon is known as electron paramagnetic resonance (EPR).

DESCRIPTION OF THE PREFERRED EMBODIMENT

Seawater, as well as other materials, contains magnetic moments of both electrons and protons. These moments attempt to align themselves with the earth's magnetic field vector, but are prevented from obtaining perfect alignment by finite temperature. Therefore, the moments precess about the earth's field vector at a frequency $\omega$ which is a function of the intensity of the earth's field ($\omega_{RF} = \gamma H_0$) where:

$\omega_{RF}$=resonance frequency in radians per second
$H_0$=ambient magnetic field intensity in oersteds
$\gamma$=gyromagnetic ratio If there is a change in the field intensity at any two points, the corresponding precessional frequencies will be different. When an alternating field at the same frequency as the precessional frequency is applied to the precessing magnetic moments, an energy absorption from the alternating field occurs. On the other hand, alternating fields not having the resonant frequency are not absorbed. If an alternating field is varied in frequency about the precessional frequency, an energy absorption from the (RF) field will occur at the precessional frequency.

Referring now to FIG. 1, the apparatus according to the invention includes a radiation source 11, specifically an optical maser (laser). The specific configuration of the laser, its associated power supply and the optical system are well known in the art in several forms and the details thereof do not form a specific part of the present disclosure. The coherent light of the laser beam is (AM) amplitude modulated at the resonant frequency of the magnetic moments by laser modulator 12 of any suitable construction. In addition an (RF) modulator 13 provides a radio frequency signal from (RF) oscillator 13a which is swept by a sweep frequency oscillator 13b, over a range of near resonant frequencies. The output signal at 13e is a time varying voltage (60 cycles) and acts to control a voltage controlled oscillator in (RF) modulator 13c.

The radiant beam is directed by a scanner 14a of any suitable well known construction, at a target 15 and a resonant absorption occurs in the surface of the scanned area. This absorption, when related to the (RF) oscillation, corresponds to the magnetic field ($H_0 = \omega_{RF}/\gamma$). When the radiant beam is directed toward a scanning area such as the sea, reflection or back scatter will occur. The reflected radiation is received by an optical receiver 14b, of suitable well known construction, and is amplified and detected, for example, by sensitive photocells or similar well known means in the amplifier detector 16. The optical receiver 14b and amplifier detector 16 may be of any suitable well known construction. One particular configuration (not shown in detail), which may advantageously be employed as an amplifier detector, includes a traveling wave tube having a photoemissive cathode. Two different frequencies of coherent radiant energy, a first frequency from the output and a second frequency from the reflected beam are directed at the photoemissive cathode, and the traveling wave tube provides an amplified output of the difference frequency. In the preferred embodiment, another alternative is shown wherein a photomultiplier and tuned (RF) receiver and amplifier 16a, provides detection and amplification, and an (RF) spectrum analyzer including (RF) detector units 16b and 16c provides the signal for wave analysis. The detected signal, $X_2$, corresponds to the change in intensity of (RF) attributed to the absorption due to resonance, is fed from the detector 16c to an indicator 18 which has its horizontal sweep synchronized by the output of sweep frequency generator 13a, $X_1$, that is, with the same frequency which was used to frequency modulate (FM) the radio frequency (RF) wave, thus preventing a resonance absorption line.

The input signal $X_3$ in FIG. 1 represents the output of a manually adjustable device or rheostat 13d applied to the (RF) oscillator 13b for adjusting that oscillator to locate the point at which the greatest resonant absorption occurs. This adjustment (not shown in detail) may advantageously be obtained by manual adjustment of an impedance device, and alternatively from the system shown in FIG. 3, and described below.

Figure 2:
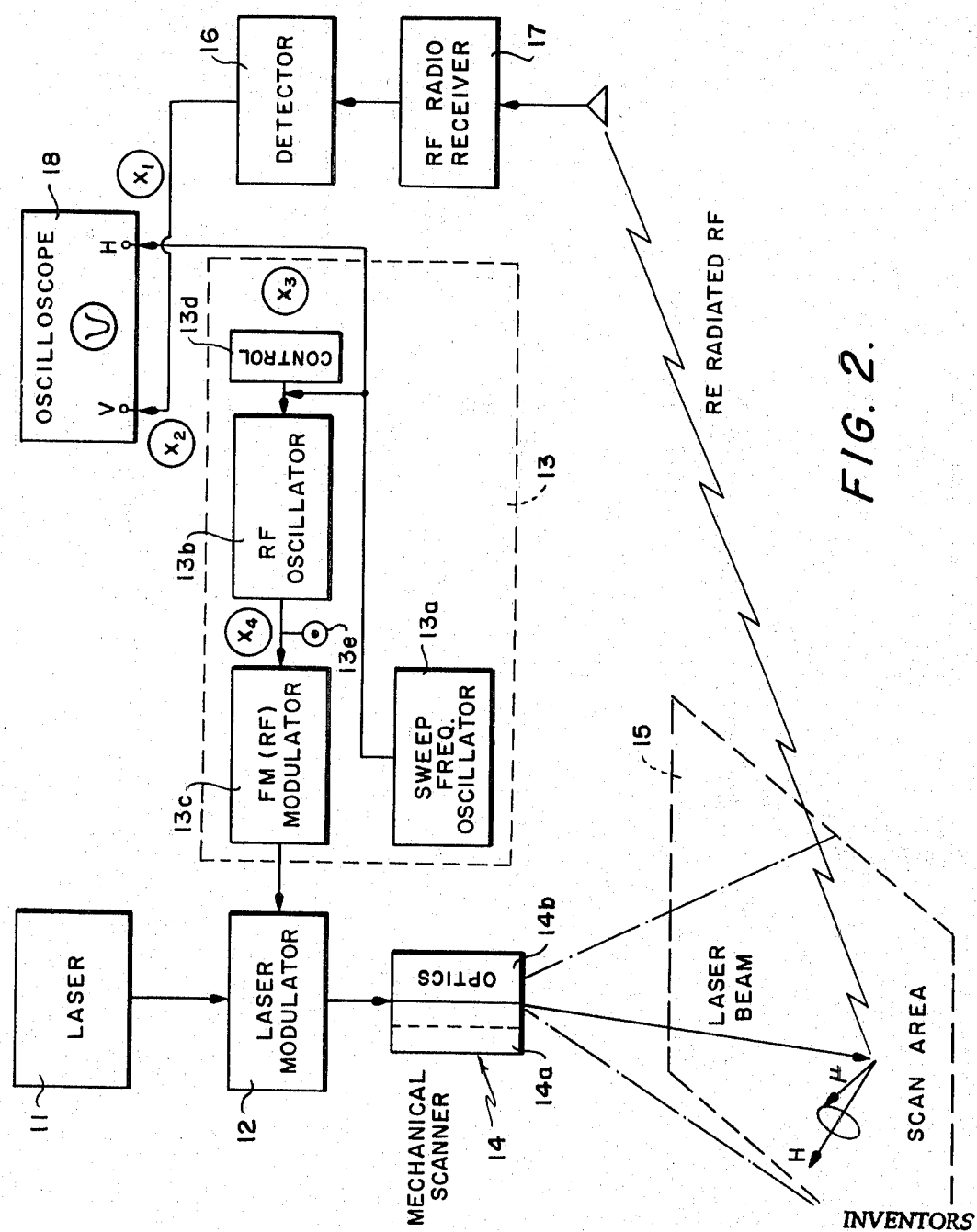
FIG. 2 illustrates a block diagram of a second embodiment of the invention.

The second embodiment of the system, illustrated in FIG. 2, utilizes the same basic configuration as previously described. However, the re-radiated system is slightly different in that the detector is tuned to the (RF) of the modulated laser beam instead of detecting the reflected laser beam. The (RF) radio receiver 17 has a very high gain and a directional, high gain antenna. The (RF) receiver 17 tracks or follows the laser modulation frequency at all times so as to obtain the resonance absorption curve. When the center frequency corresponding to the absorption curve peak is found, it is correlated, in a well known manner, with a point on the target area 15 and then contoured on any suitable display means such as the television screen 18 or a contour plotter.

Figure 4:
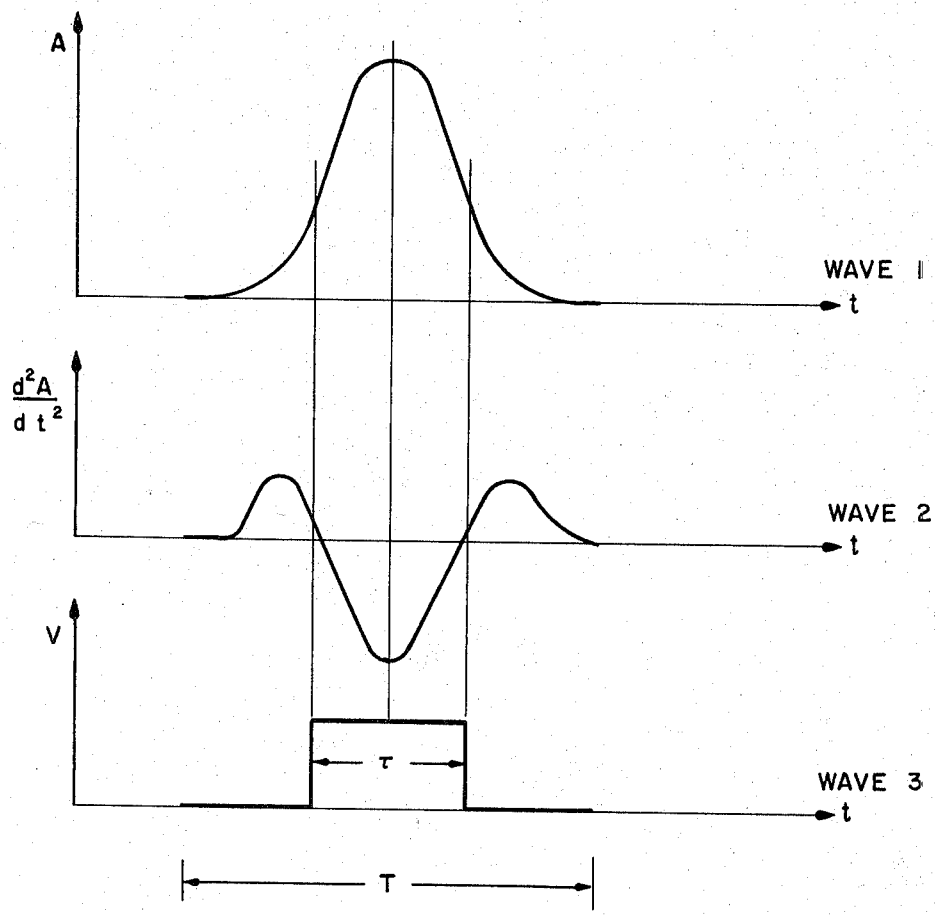
FIG. 4 illustrates the wave form of an absorption resonance signal of the invention.

FIG. 3 shows a system which may be used for extracting and displaying the absorption signal. The output signal 19d, $X_3'$ of signal processing and system control 19' is part of a servo mechanism, that is, the output $X_3'$ of signal processing and system control 19 is an error signal when (RF) oscillator 13b is off the resonant frequency and is used to adjust the frequency of (RF) oscillator 13b to the resonant frequency. The output signal $X_3'$ of signal processing and system control 19 corresponds to the output of the manually adjustable control 13d mentioned above. As the (RF) oscillator 13b approaches the resonant absorption frequency, the output signal $X_3'$ decreases until it reaches zero and (RF) oscillator 13b will remain locked onto that resonant frequency. Wave 1, of FIG. 4, is a sample resonant absorption curve derived from the resonant absorption signal $X_2$. This signal is the output signal $X_4$ of (RF) oscillator 13b, and is fed into the input $X_4'$, 19c of signal processing and system control 19. It is possible, at output 13e of (RF) oscillator 13b, to obtain the resonant absorption frequency. With the use of a preset counter or a scaling counter (not shown), it is possible to obtain H, which corresponds to the strength of the magnetic field, directly from the scale.

The amplitude of the resonant absorption signal $X_2$ is differentiated twice with respect to time, resulting in clearly defined half maximum amplitude zero crossing points, wave 2, FIG. 4. This signal is then used to gate a monostable multivibrator or other digital apparatus in the signal processing and system control 19. The pulse width of wave 3, FIG. 4, which is derived, for example, by using a Schmitt trigger, is compared digitally with the period T where $T$=period of the sweeping frequency $(1/f)$. If the center frequency corresponding to the center of the pulse $\gamma$ is known, this frequency can be related to the magnetic field intensity directly by the equation $H = 2\pi f_{FR}/\gamma$, where $f_{RF}$ is the resonant frequency.

The signal processing and control system 19 provides suitable input signals for display and operates in a well known manner. The laser scanner control 21, contains well known circuitry coupled to the signal processing and system control 19, television screen 18 and mechanical scanner 14 for contour presentation.

EXAMPLE I

One example of apparatus which may be used to illustrate the technique of this invention includes a Perkin-Elmer model 5200 gas laser and a Perkin-Elmer model 5202 laser power supply. This laser system can be modulated from zero to a maximum frequency of 200 kc. This corresponds to a magnetic field intensity of 71.5 milli-oersteds. For free electrons exhibiting electron spin resonance, $f = \omega/2\pi = g\mu H/h$ where:

$f$=resonance frequency in c.p.s.
$\omega$=resonance frequency in radians/sec.
$g$=spectroscopic splitting factor
$\mu$=electron magnetic moment
H=magnetic field in oersteds
$h$=Plancks' constant For free electrons, $g=2$, therefore $f$ (in megacycles)$=2.80H$ In conformance with the apparatus as shown in FIG. 1, the wave analyzer or (RF) spectrum analyzer used in the example may be a Hewlett-Packard model 312A with a matching signal generator Hewlett-Packard Oscillator HP model 313A. Instead of an oscilloscope, the output device may be a recorder for displaying the resonance curve, such as a Sanborn model 322. The center of the resonance curve corresponds to a frequency which is proportional to the magnetic field.

EXAMPLE II

In an example used to illustrate the technique of this invention for use in an aircraft or satellite, a two watt Argon ion laser (Spectra Physics model 140 or similar two watt continuous wave laser) and a Spectra Physics model 320 codulator having a bandwidth of 75 mc. are used. This laser and modulator system may also be used in the device of Example I. The laser and modulator are mounted in an aircraft in such a manner as to sweep the area below the aircraft. As the area is swept with the laser beam, magnetic field contours are displayed on a television screen. In this example, an MEL Autocon System, as described in a report (W. W. Anderson, Marine Engineering Laboratory Report No. 81–284, dated Sept. 11, 1963, and also patent application, Ser. No. 327,155, filed Nov. 29, 1963) is used for visual display of the magnetic field contours.

EXAMPLE III

An example of the re-radiation system as shown in FIG. 2, uses a very sensitive receiver such as the National Radio Company HRO–5 having a directional high gain antenna.

Thus a system for measuring the earth's magnetic field using an electron paramagnetic resonance frequency modulated laser has been described. The major advantage of the invention is that it may be located away from the area to be measured, i.e., from a few feet to several hundred miles. Because it is possible to scan large areas with each pass, the number of passes necessary to cover a desired area is decreased, thereby providing a great advantage in ASW applications and geomagnetic surveys.

Obviously many modifications and variations of the present invention are possible in the light of the above teachings.

What is claimed is:

1. A system for sensing the strength of a magnetic field comprising:
    a sample within a magnetic field;
    a source of a beam of continuous coherent radiant energy;
    a modulating means for amplitude modulating said beam of energy whereby the generated sidebands cyclically vary over a band of frequencies having as a center the frequency of the radiant energy and including the precession frequency of said sample within the magnetic field;
    means for transmitting and selectively directing said modulated beam of energy to the surface of said sample whereby said sample absorbs maximum energy from said modulated beam at said precession frequency;
    means for receiving and detecting energy reflected from said sample; and
    means, connected to said means for receiving and detecting, for presenting an indication of the modulation frequency at which the maximum absorption of said transmitted beam of energy occurs, the strength of the magnetic field at the surface of said sample and any variations in the magnetic field.

2. The system of claim 1 wherein said source of radiant energy comprises:
    an optical maser.

3. The system of claim 1 wherein said modulating means comprises:
    a first frequency source; and
    a second frequency source operatively connected to said first frequency source for sweeping said first frequency source over a range of near resonant frequencies.

4. The system of claim 1 wherein said means for receiving and detecting energy comprises:
    a photomultiplier; and
    an RF spectrum analyzer operatively connected to said photomultiplier.

5. The system of claim 1 wherein said means for receiving and detecting energy comprises:
    a high gain (RF) radio receiver having a high gain directional antenna; and
    a detector, said detector being tuned to the (RF) radio frequency of modulated radiant energy.

6. The system of claim 2 wherein said means for receiving and detecting energy comprises:
    a photomultiplier within said receiver means;
    an (RF) spectrum analyzer connected to receive the output of said photomultiplier;

a signal processing and control system connected to receive the output of said analyzer; and scanner controls connected to synchronize the scan of the selective directing means and the indicator means.

7. A system for sensing the magnetic field surrounding a selected sample comprising:

a sample within a magnetic field;

a source of a beam of continuously radiated coherent electromagnetic radiation;

modulating means for amplitude modulating said beam of energy whereby the generated sidebands cyclically vary over a band of frequencies having as a center the frequency of the radiant energy and including the Larmor frequency of said sample;

means for transmitting and selectively directing said modulated beam of energy to the surface of said sample whereby radiant energy from said modulated beam is reradiated by said sample at said precession frequency;

means for receiving and amplifying the radiant energy reradiated from the surface of said sample; and means, connected to said means for receiving and amplifying, for presenting an indication of the modulation frequency at which the maximum reradiation from said transmitted beam of energy occurs, the strength of the magnetic field surrounding said sample and any variations of the magnetic field.

8. A system for detecting the variation of the earth's magnetic field vector that is due to the presence of a foreign object comprising:

an optical maser radiation source for transmitting a beam of coherent radiated energy to strike the earth's surface with sufficient intensity to excite the surface point of incidence to electron paramagnetic resonance;

modulating means for amplitude modulating said beam of energy whereby the generated sidebands cyclically vary over a band of frequencies having as a center the frequency of the radiant energy and including the frequency of electron paramagnetic resonance of said surface point of incidence;

means for transmitting and selectively directing said modulated beam of energy to said surface point of incidence whereby said surface point of incidence absorbs maximum energy from said modulated beam at said frequency of electron paramagnetic resonance;

means for receiving and detecting radiation reflected from said surface point of incidence; and means, connected to said means for receiving and detecting, for presenting an indication of the modulation frequency at which the maximum absorption of the modulated beam energy by the surface point of incidence occurs, the strength of said magnetic field vector and any variations of the magnetic field vector.

References Cited

UNITED STATES PATENTS

| | | | |
|---|---|---|---|
| 3,173,082 | 3/1965 | Bell | 324—.5 |
| 3,060,371 | 10/1962 | Townsend | 324—.5 |
| 3,398,355 | 8/1968 | Barringer | 324—.5 |
| 3,411,070 | 11/1968 | Anderson | 324—.5 |
| 3,437,914 | 4/1969 | Barringer | 324—.5 |

RUDOLPH V. ROLINEC, Primary Examiner

M. J. LYNCH, Assistant Examiner